(12) United States Patent
Piao

(10) Patent No.: US 11,725,712 B2
(45) Date of Patent: Aug. 15, 2023

(54) CORD LOCK

(71) Applicant: NIFCO INC., Yokosuka (JP)

(72) Inventor: Xianyong Piao, Yokosuka (JP)

(73) Assignee: NIFCO INC., Yokosuka (JP)

( * ) Notice: Subject to any disclaimer, the term of this patent is extended or adjusted under 35 U.S.C. 154(b) by 1 day.

(21) Appl. No.: 17/640,126

(22) PCT Filed: Aug. 28, 2020

(86) PCT No.: PCT/JP2020/032565
§ 371 (c)(1),
(2) Date: Mar. 3, 2022

(87) PCT Pub. No.: WO2021/049323
PCT Pub. Date: Mar. 18, 2021

(65) Prior Publication Data
US 2022/0333668 A1    Oct. 20, 2022

(30) Foreign Application Priority Data

Sep. 11, 2019   (JP) .................................. 2019-165652

(51) Int. Cl.
*F16G 11/10* (2006.01)
*A43C 7/08* (2006.01)

(52) U.S. Cl.
CPC .............. *F16G 11/101* (2013.01); *A43C 7/08* (2013.01)

(58) Field of Classification Search
CPC ........ F16G 11/101; F16G 11/106; A43C 7/08; A43C 1/06; A44B 11/26; A44B 99/00
See application file for complete search history.

(56) References Cited

U.S. PATENT DOCUMENTS

| 6,339,867 B1 | 1/2002 | Azam |
| 9,797,421 B2 * | 10/2017 | Gaudillere ............. A44B 11/08 |
| 10,285,813 B2 * | 5/2019 | Kocaturk .............. F16G 11/101 |
| 10,368,607 B2 * | 8/2019 | Dyer ..................... A43C 11/20 |

(Continued)

FOREIGN PATENT DOCUMENTS

| JP | 2019-047949 A | 3/2019 |
| WO | 2010/102131 A1 | 9/2010 |

OTHER PUBLICATIONS

PCT/ISA/210, "International Search Report for International Application No. PCT/JP2020/032565," dated Oct. 27, 2020.

*Primary Examiner* — Robert Sandy
*Assistant Examiner* — Louis A Mercado
(74) *Attorney, Agent, or Firm* — Manabu Kanesaka

(57) ABSTRACT

A cord lock includes a cord lock main body as a case which houses the same. The cord lock main body is made such that locking on the cord is released by a pulling operation to reduce an insertion amount of a portion of a male member into an insertion passage. The case forms a cylindrical shape with openings on both ends through which the cord can pass and combines with the cord lock main body side in a manner allowing the case to be reciprocally moved along the cylinder axis direction. When the case is moved forward, the pulling action is made with a first engage-abutting portion of the case engaging an engage-abutted portion. When the case is moved backward, the pulling operation is made with a second engagement portion of the case engaging the engagement portion of the case engage-abutted portion of the male member.

9 Claims, 20 Drawing Sheets

(56) References Cited

U.S. PATENT DOCUMENTS

| | | | |
|---|---|---|---|
| 10,398,197 B2* | 9/2019 | Shimizu | F16G 11/106 |
| 10,508,713 B2* | 12/2019 | Shimizu | F16G 11/044 |
| 10,718,404 B2* | 7/2020 | Shimizu | F16G 11/106 |
| 11,129,447 B2* | 9/2021 | Dyer | A43C 11/004 |
| 11,199,244 B2* | 12/2021 | Nanbu | F16G 11/101 |
| 11,382,389 B2* | 7/2022 | Blanche | A43B 7/1495 |
| 2011/0313434 A1 | 12/2011 | Kocaturk | |
| 2016/0081798 A1 | 3/2016 | Kocaturk | |
| 2019/0078646 A1 | 3/2019 | Shimizu et al. | |
| 2020/0138145 A1* | 5/2020 | Greenspan | A43C 1/006 |
| 2021/0235819 A1* | 8/2021 | Andreasen | A43B 23/26 |

* cited by examiner

CORD LOCK

FIELD OF THE INVENTION

The present invention relates to an improvement of a cord lock.

BACKGROUND OF THE INVENTION

There is a Patent Document 1 as a cord lock, which comprises a female member having a first opening, a second opening, and an insertion path for a cord extending between the first opening and a second opening, and a male member, a portion of which is inserted into the insertion path from the first opening side, having a male side fastening member on the portion, which cooperates with a female side fastening member formed in the insertion path and fixes the cord inserted into the insertion path, wherein fastening to the cord is released by a pulling operation reducing an insertion amount of a part of the male member to the insertion path.

The cord lock in the Patent Document 1 is required in the pulling operation, due to the structure thereof, to hold only either one of the female member and the male member. Therefore, the pulling operation is hard to perform instinctively.

PRIOR ART DOCUMENT

Patent Document

Patent Document 1: Japanese Patent Publication No. 2019-47949

SUMMARY OF THE INVENTION

The main subject to be released by the invention is that the pulling operation for releasing the fastening to the cord in this kind of the cord lock can be done by holding any part of the cord lock.

Means for Releasing Problems

In order to release the problems, in the present invention, in a first aspect, a cord lock comprises a cord lock main body, and a case retaining the cord lock main body, wherein the cord lock main body comprises:

a female member having a first opening, a second opening, and an insertion path for a cord extending between the first opening and the second opening, and a male member, a part of which is inserted into the insertion path from a first opening side, having a male side fastening member formed on said part, fasted to the cord inserted into the insertion path cooperating with a female side fastening member formed in the insertion path, fastening to the cord is released by a pulling operation of reducing an insertion amount of said part of the male member into the insertion path, the case has a cylindrical shape with passing openings for the cord at two ends, and is assembled with the cord lock main body to be able to reciprocate along a cylindrical axis direction, at a time of a forward movement of the case, a first engage-abutting portion of the case engage-abuts against an engage-abutted portion of the female member and the pulling operation is made, and at a time of a backward movement of the case, a second engage-abutting portion of the case engage-abuts against an engage-abutted portion of the male member and the pulling operation is made.

According to the above structure, it is possible to release an engage-abutting condition between the cord lock main body and the cord by the forward movement and the backward movement of the case in a state that a desired position of the case is held by one hand.

In one aspect of the invention, the case has a size covering an entirety of the cord lock main body.

In one aspect of the invention, a wall portion is formed between the first engage-abutting portion and the second engage-abutting portion of the case for preventing wobbling in a left-right direction of the cord lock main body.

In one aspect of the invention, the first engage-abutting portion of the case is a step portion oriented on one side of the passing openings, and abutting against the engage-abutted portion of the female member at a position where the cord lock main body is fully inserted into the case from the one of the passing openings.

In one aspect of the invention, the second engage-abutting portion of the case is a projection caught at the engage-abutted portion of the male member from one side of the passing openings at a position where the cord lock main body is fully inserted into the case from the one of the passing openings.

In one aspect of the invention, a spring member for accumulating force by the pulling operation is interposed between the female member and the male member.

Advantages of the Invention

In accordance with the invention, the pulling operation for releasing fastening to the cord in the cord lock main body can be made by holding any portion of the case, so that the pulling operation can be made instinctively.

EMBODIMENTS OF THE INVENTION

Figure 1:
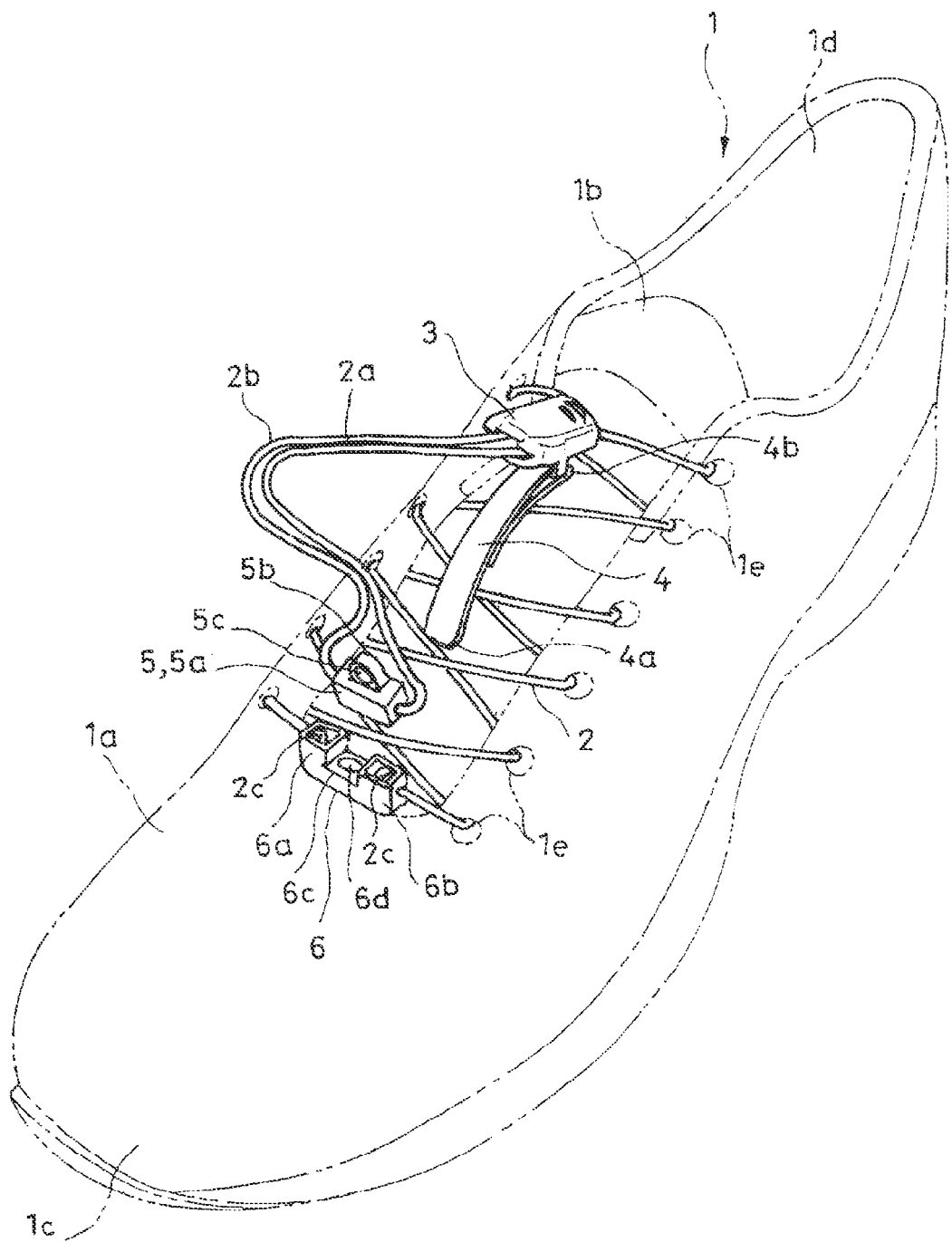
FIG. 1 is a perspective structural view of a shoelace fastening device formed by using a cord lock (first embodiment) according to one embodiment of the invention, wherein a shoe is indicated by imaginary lines.
Figure 2:
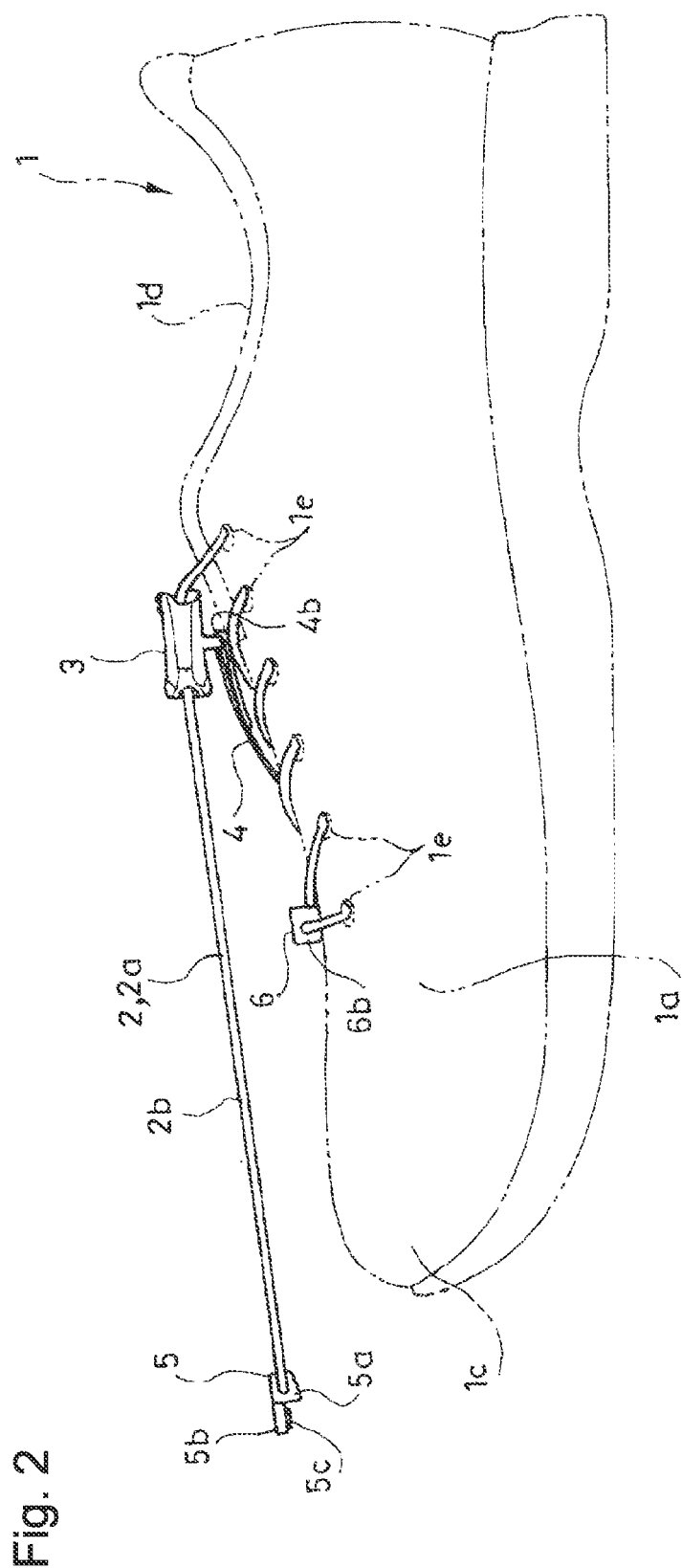
FIG. 2 is a side view of the shoelace fastening device, wherein the shoe is indicated by imaginary lines.

Hereinafter, typical embodiments of the invention will be explained based on FIGS. 1-23.

In a cord lock 3 of the embodiment, a pulling operation of releasing the fastening to a lace 2 can be made by holding any part of a cord lock 3.

FIGS. 1-5 show a shoelace fastening device which is the cord lock 3 (first embodiment) as a substitute device for a knot. The shoelace fastening device is attached to an extending portion 2a of the lace 2 for a shoe 1 as a shoelace attached to an upper 1a of the shoe 1, and is designed not to loosen the lace 2 as the shoelace without forming a knot at the extending portion 2a as well as loosening of the lace 2 as the shoelace can be made easily.

The shoelace fastening device comprises, as shown in FIG. 1, the cord lock 3 as the substitute device for the knot, and a connecting member 4. A shoelace fastening device with a shoelace is formed by the shoelace fastening device and the lace 2 as the shoelace.

In the cord lock as the substitute device for the knot, left and right extending portions 2a of the lace 2 as the shoelace extending from the shoe 1 pass therethrough and fastened at a desired position. Also, in the cord lock as the substitute device for the knot, by a moving operation along the extending portions 2a with a predetermined force, fastening relative to the extending portions 2a can be released, and by stopping the moving operation, fastening to the extending portion 2a can be made again.

Incidentally, in the specification, left and right mean left and right seen from a toe 1c side.

The connecting member 4 connects the cord lock 3 as the substitute device for the knot and the upper 1a of the shoe 1.

In the present embodiment, one end 4a of the connecting member 4 is connected to a tongue 1b of the upper 1a.

Figure 3:
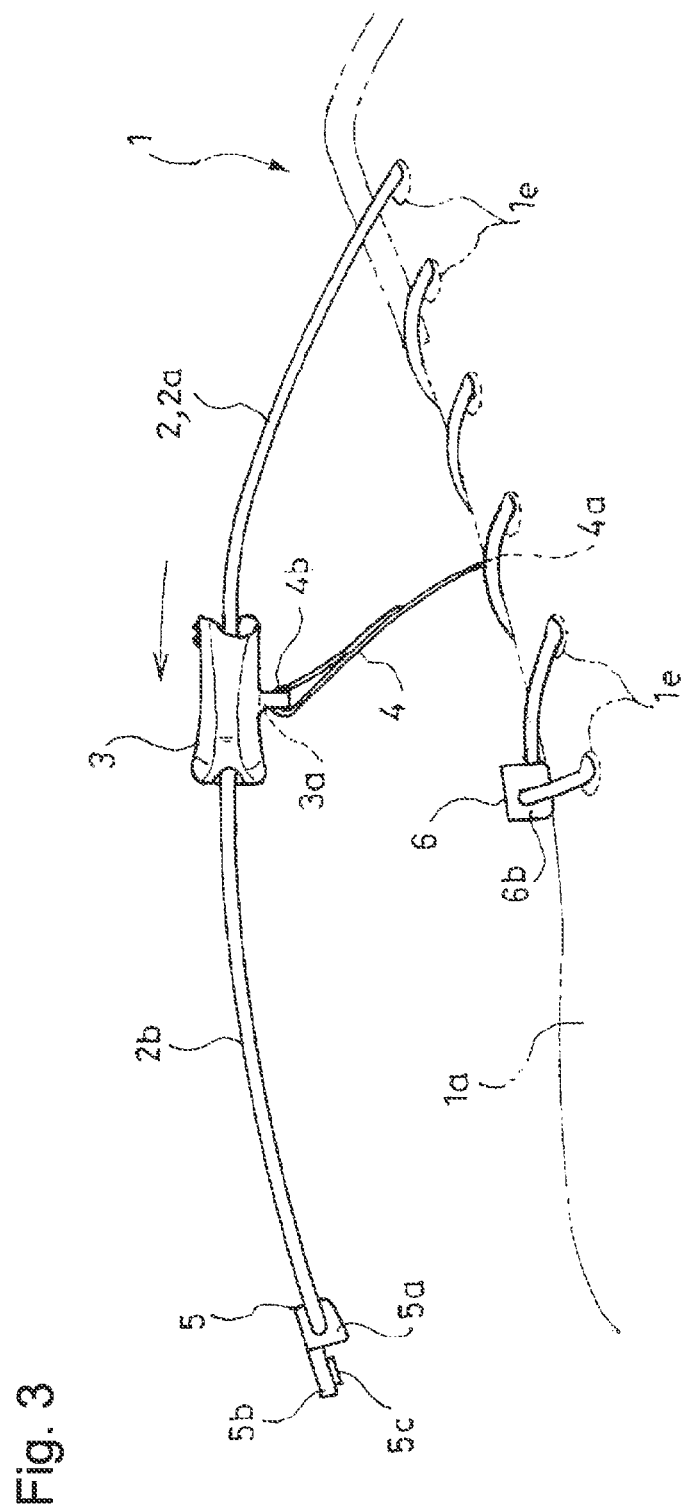
FIG. 3 is an enlarged side view of a main part of the shoelace fastening device, showing a state of a loosening operation in a state that the shoelace is fastened by the cord lock.
Figure 4:
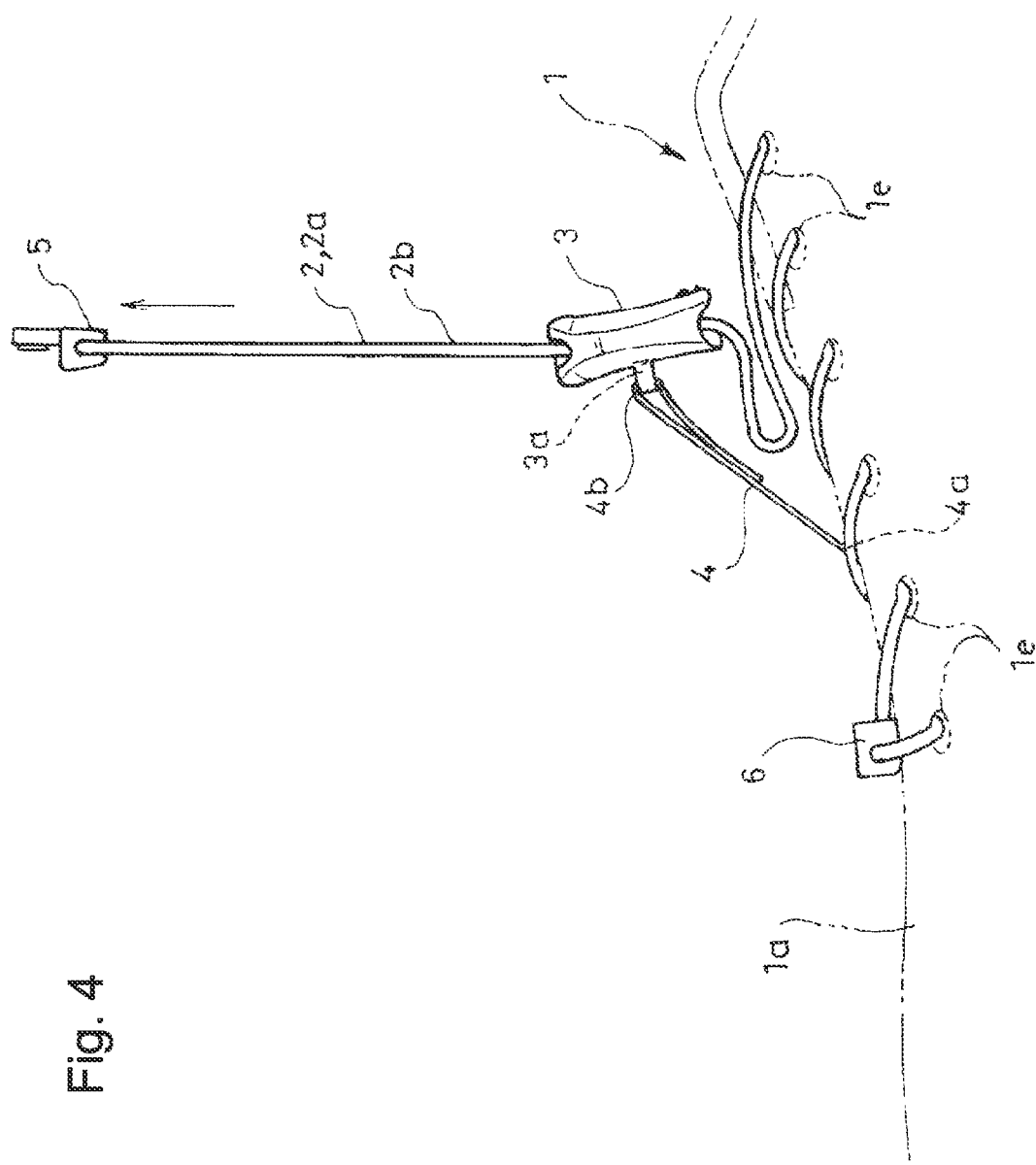
FIG. 4 is an enlarged side view of a main part of the shoelace fastening device, showing a state of operation of tightening the shoelace again from a state of loosening of the shoelace by the cord lock.
Figure 5:
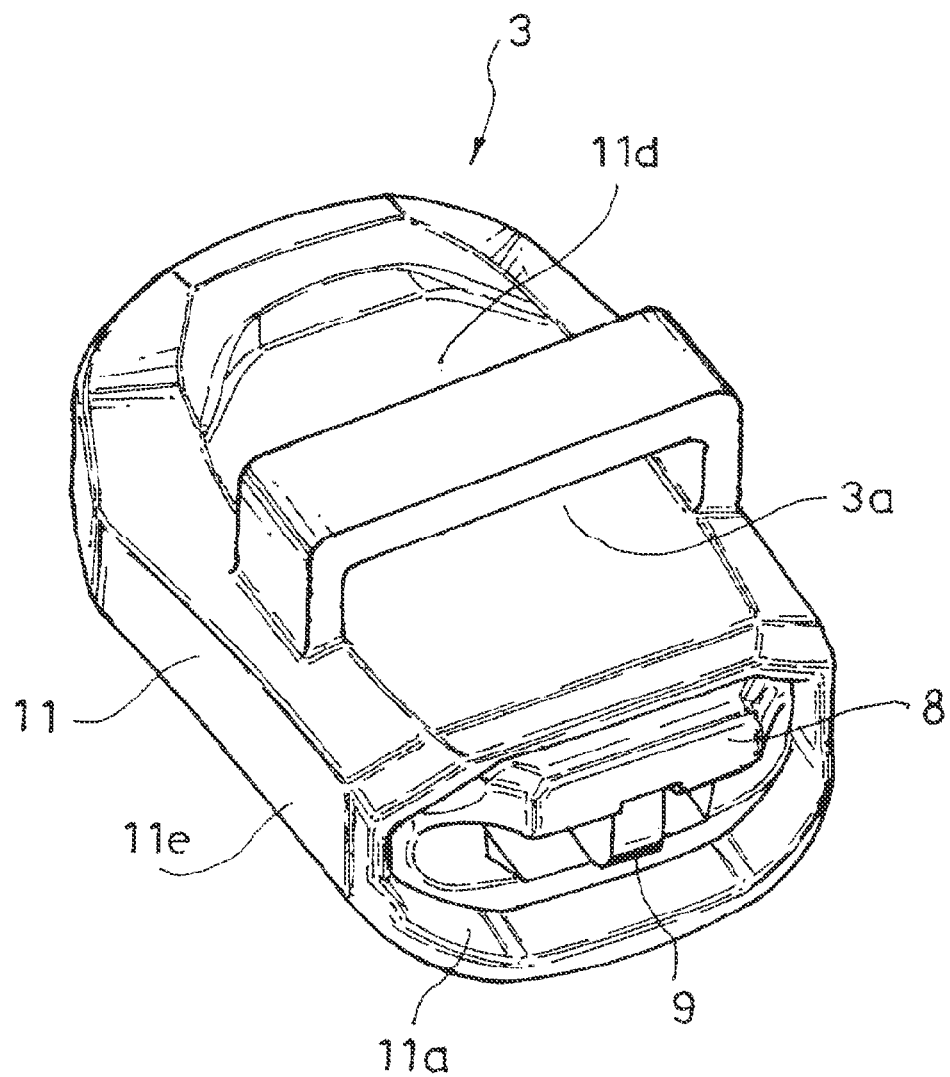
FIG. 5 is a perspective view of the cord lock forming the shoelace fastening device.
Figure 6:
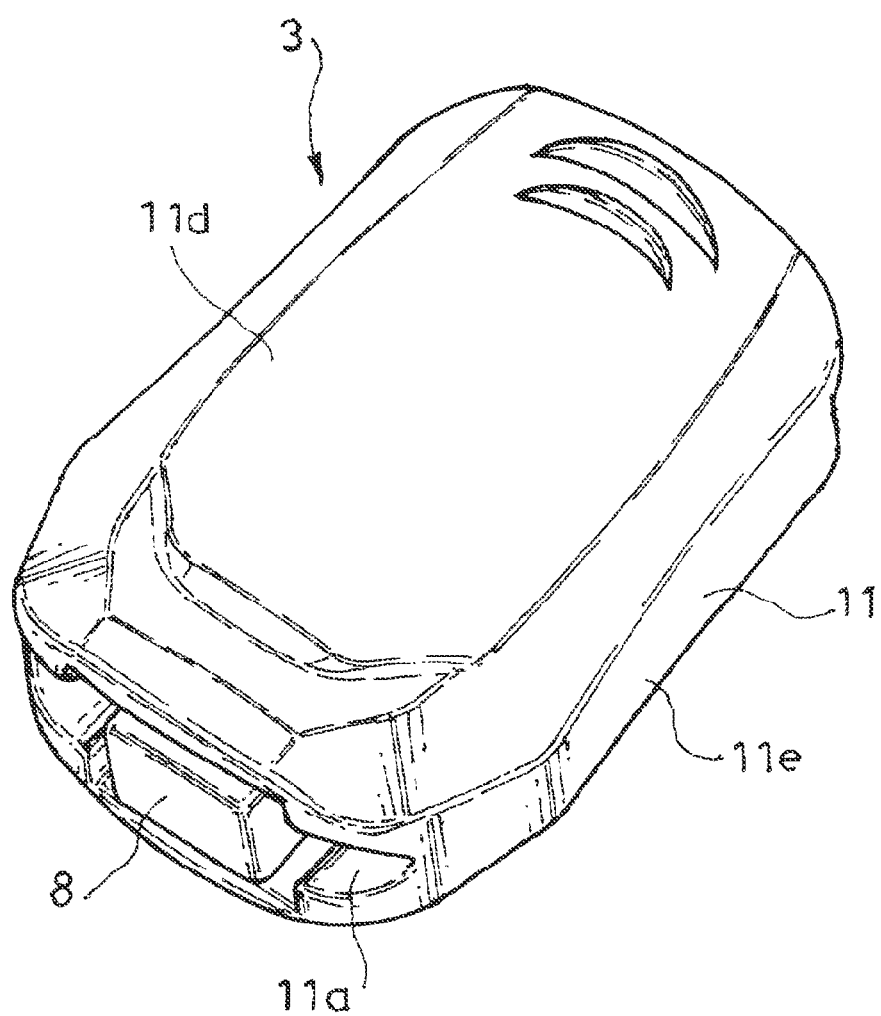
FIG. 6 is a perspective view of the cord lock (second embodiment) according to one embodiment of the invention.
Figure 7:
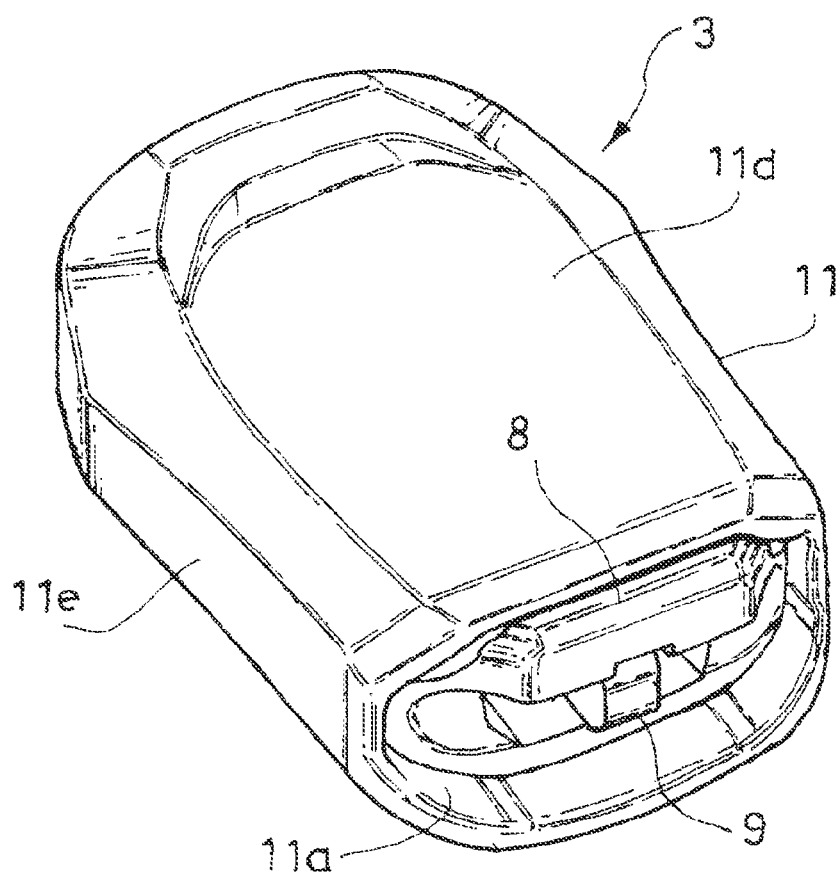
FIG. 7 is a perspective view of the second embodiment.
Figure 8:
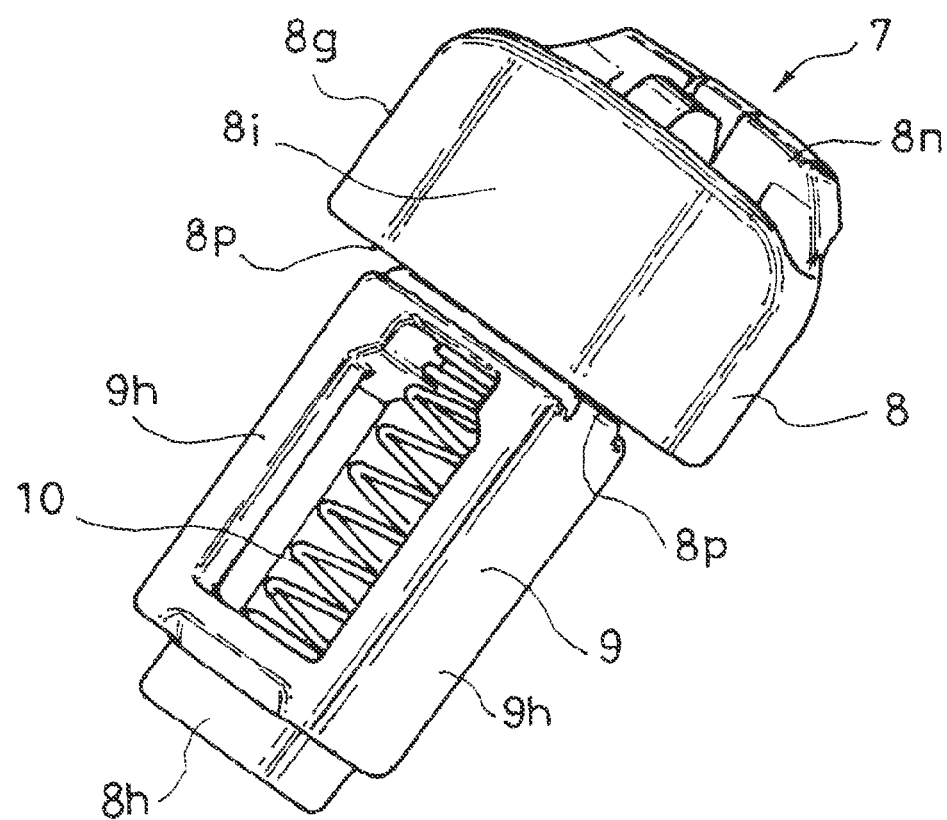
FIG. 8 is a perspective view of a cord lock main body forming the second embodiment.
Figure 9:
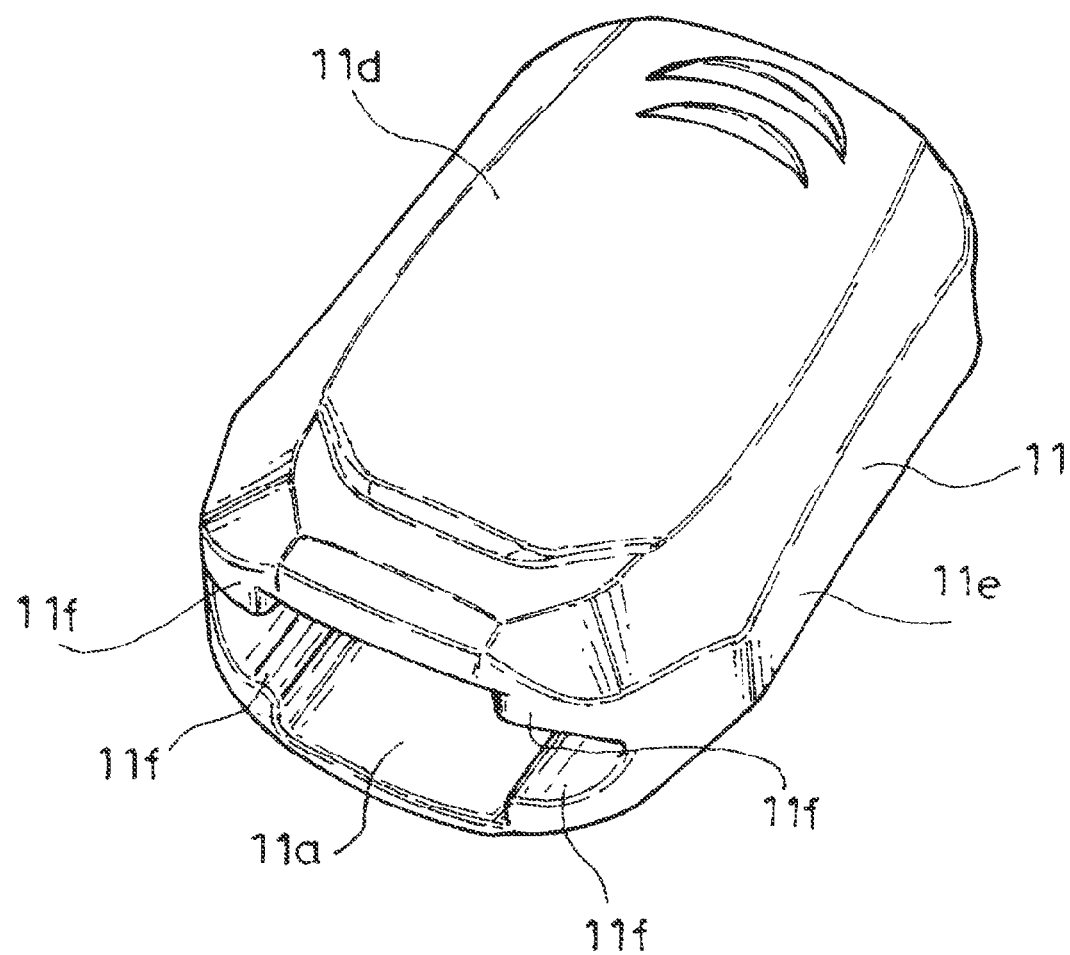
FIG. 9 is a perspective view of a case forming the second embodiment.

Also, the other end 4b of the connecting member 4 passes, as shown in FIGS. 3 and 4, through a through hole 3a formed at the cord lock 3 as the substitute device for the knot and is connected to the cord lock 3 as the substitute device for the knot.

In the illustrated embodiment, the connecting member 4 is formed by a flat shape member (tape). The connecting member 4, where a lower end side which is the one end 4a is fixed to the tongue 1b, passes through the through hole 3a formed in a case 11, explained later, forming an outer portion of the cord lock 3 as the substitute device for the knot, is connected, by fixing an upper end taken out through the through hole to a middle portion of the connecting member 4, to the cord lock 3 as the substitute device for the knot. Thereby, the cord lock 3 as the substitute device for the knot is connected to the upper 1a of the shoe 1 through the connecting member 4.

In the illustrated embodiment, the though hole 3a is made by forming a passing portion along a cylinder shaft direction y of the case 11 in a projecting portion formed outside one of wide width portions 11d of the case 11.

In a fastening state where the cord lock as the substitute device for the knot contacts the tongue 1b (refer to FIGS. 1 and 2) on a wearing opening 1d side, i.e. between the left and right shoe lace holes 1e, the lengths of the extending portions 2a withdrawn from the cord lock 3 as the substitute device for the knot become the maximum, so that the length of the lace 2 as a shoe lace passing through the shoe lace holes 1e becomes minimum, and the lace 2 as the shoe lace comes to the most tightened condition.

When, from this fastening condition, by holding the cord lock 3 as the substitute device for the knot and pulling the cord lock 3, with a predetermined force, as the substitute device for the knot in a direction to increase lengths of the extending portions 2a between the cored lock 3 as the substitute device for the knot and the shoe 1, fastening between the cord lock 3 as the substitute device and the extending portions 2a is released, so that the cord lock 3 as the substitute device for the knot can be moved along the extending portions 2a (refer to FIG. 3). Accordingly, by pulling by one hand the cord lock 3 as the substitute device for the knot with a predetermined force, the lace 2 as the shoe lace can be loosened (loosening condition). In the illustrated embodiment, a second engage-abutment portion 11c of the case 11 explained later engage-abuts against an engage-abutted portion 9i of the male member 9 to thereby reduce an entering amount of a part of the male member 9 into the female member 8. As a result, the fastening of the cord lock 3 as the substitute for the knot to the lace 2 as the shoe lace is released, so that the cord lock 3 as the substitute for the knot can be moved to the toe 1c side of the shoe 1 along the extending portions 2a.

On the other hand, when a portion 2b in the extending portion 2a drawn from the cord lock 3 as the substitute device for the knot is pulled upwardly over a predetermined force by using and holding a knob 5 explained later, since the cord lock 3 as the substitute for the knot is connected to the tongue 1b by the connecting member 4 and the movement away from the tongue 1b over the connecting member 4 is prohibited, after restriction of the movement, it comes to a condition same as a condition where the cord lock 3 as the substitute for the knot is moved along the extending portion 2a over the predetermined force. A this time, fastening between the cord lock 3 as the substitute for the knot and the extending portion 2a is released, and the cord lock 3 as the substitute for the knot can be moved upwardly to a position where the fastening condition is once again obtained (refer to FIG. 4). Accordingly, the portion 2b in the extending portion 2a withdrawn from the lord lock 3 as the substitute for the knot is held by one hand and the portion 2b is pulled upward over the predetermined force, so that the loosened lace 2 can be tightened once again.

Incidentally, in the embodiment, the full length of the connecting member 4 is about half of a distance between the uppermost shoe lace hole 1e on the wearing opening 1d side and a shoe lace hole 1e of the lace 2 as the shoe lace at the lowermost side on the toe end 1c side (refer to FIGS. 1-4). In the case as this, when the cord lock 3 as the substitute for the knot is located around the shoe lace hole 1e at the lowermost side, the lace 2 as the shoe lace is loosened most, and when the cord lock 3 as the substitute for the knot is located from this condition to around the shoe lace hole 1e on the uppermost side, the lace 2 as the shoe lace can be tightened most.

Also, in the embodiment, the shoelace fastening device further includes the knob 5 for retaining the respective ends of the left and right extending portions 2a, and a holding portion 6 provided at the upper 1a of the shoe 1 and removably holding the knob 5.

In the illustrated embodiment, the knob 5 includes a sleeve portion 5a allowing the lace 2 as the shoe lace in the left and right directions, and a combining portion 5b projecting sideward from a middle position in the left and right directions of the sleeve portion 5a. In the illustrated embodiment, in a state that the lace 2 as the shoe lace passes the sleeve 5a of the knob 5, the lace 2 as the shoelace passes the shoelace hole 1e of the lace 2 as the shoelace, and the ends 2c as the lace 2 as the shoelace are positioned (refer to FIG. 1).

On the other hand, the holding portion 6 includes a left side portion 6a allowing the left side end 2c of the lace 2 as the shoelace pulled from the lowermost shoelace hole 1e to pass, and after passing, caught at a knot formed at the left side end 2c, a right side portion 6b allowing a right side end 2c of the lace 2 as the shoelace pulled from the lowermost shoelace hole 2e to pass, and after passing, caught at a knot formed at the right side end 2c, and a receiving portion 6c located between the left side portion 6a and the right side portion 6b and receiving the combining portion 5b of the knob 5.

Thereby, in the illustrated embodiment, by receiving the combining portion 5b of the knob 5 in the receiving portion 6c of the holding portion 6 in the tightening state, it is possible to loosen the portion, pulled out to the toe 1c side from the cord lock 3 as the substitute for the knot, in the extending portion 2a of the lace 2 as the shoelace, together with the upper 1a side of the shoe 1. In the illustrated embodiment, the combining portion 5b of the knob 5 is adsorbed to a magnetically adsorbed member indicated as 5c and 6c at the receiving portion 6c of the holding portion 6 (a combination of magnets, or a combination of a magnet and a ferromagnetic material).

Next, a second example of the cord lock 3 is explained based on FIGS. 6-23.

The cord lock 3 can be tightened at a desired position in the lace 2, and also, it is possible to release the tightened state by a pulling operation reducing an inserting amount of a male member 9 to a female member 8. In the example, the cord lock 3 comprises a cord lock main body 7 having the female member 8 and the male member 9, and a case 11 receiving the cord lock main body 7.

The lace 2 may have any shape (round shape, flat shape and so on), and a material and a structure (weaving lace, rubber lace, a lace made of synthetic resin and so on) as long as the tightening to the cord lock 3 is possible. The cord lock 3 is typically fastened, as in the shoe 1 explained before, to the lace 2 for a various product equipped with a portion fastened or tightened by the lace 2, while the portion can be fastened or loosened by changing the tightening position.

Figure 13:
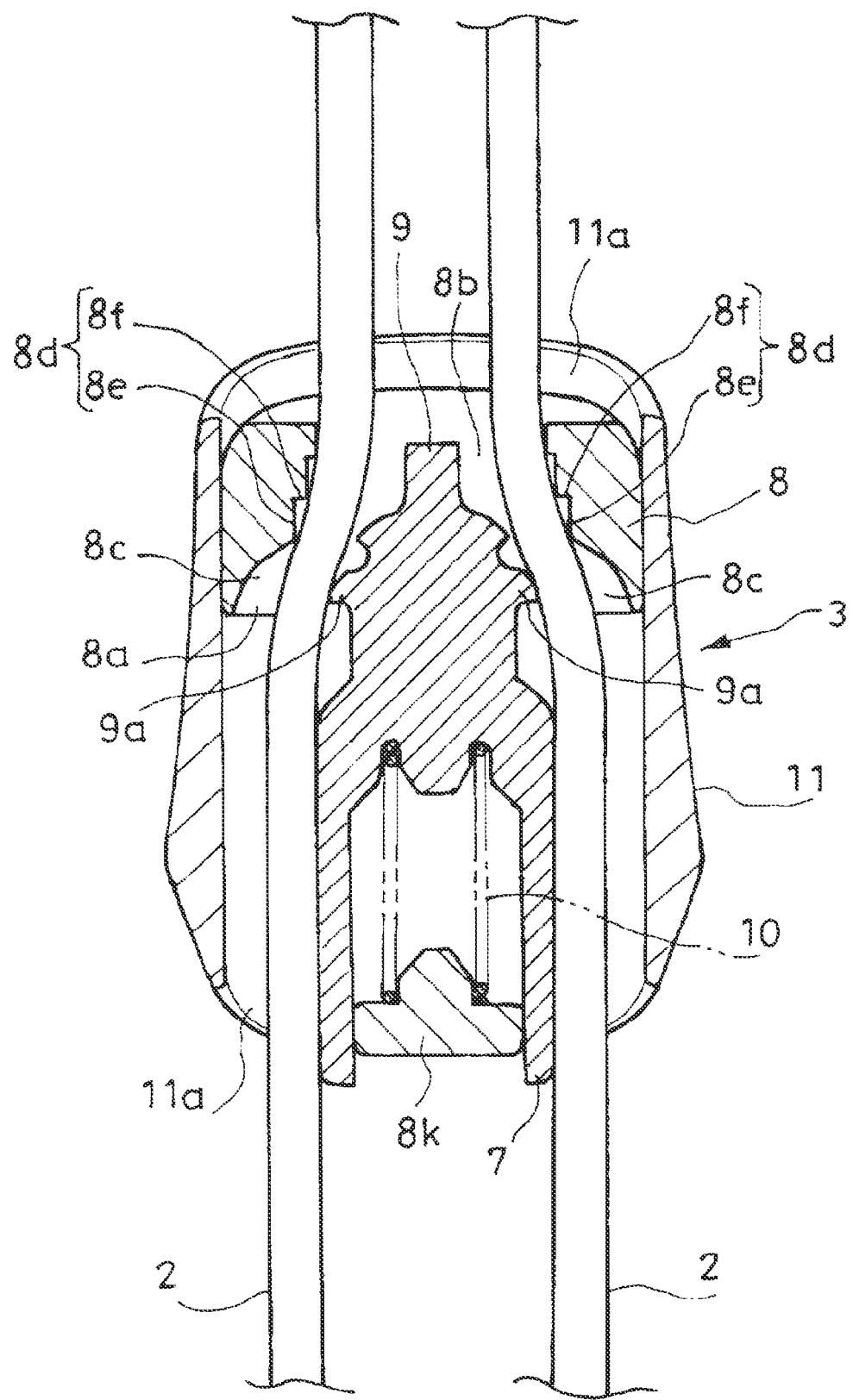
FIG. 13 is a sectional view showing a using condition of the second embodiment, showing a state of releasing the fasting to the lace.
Figure 14:
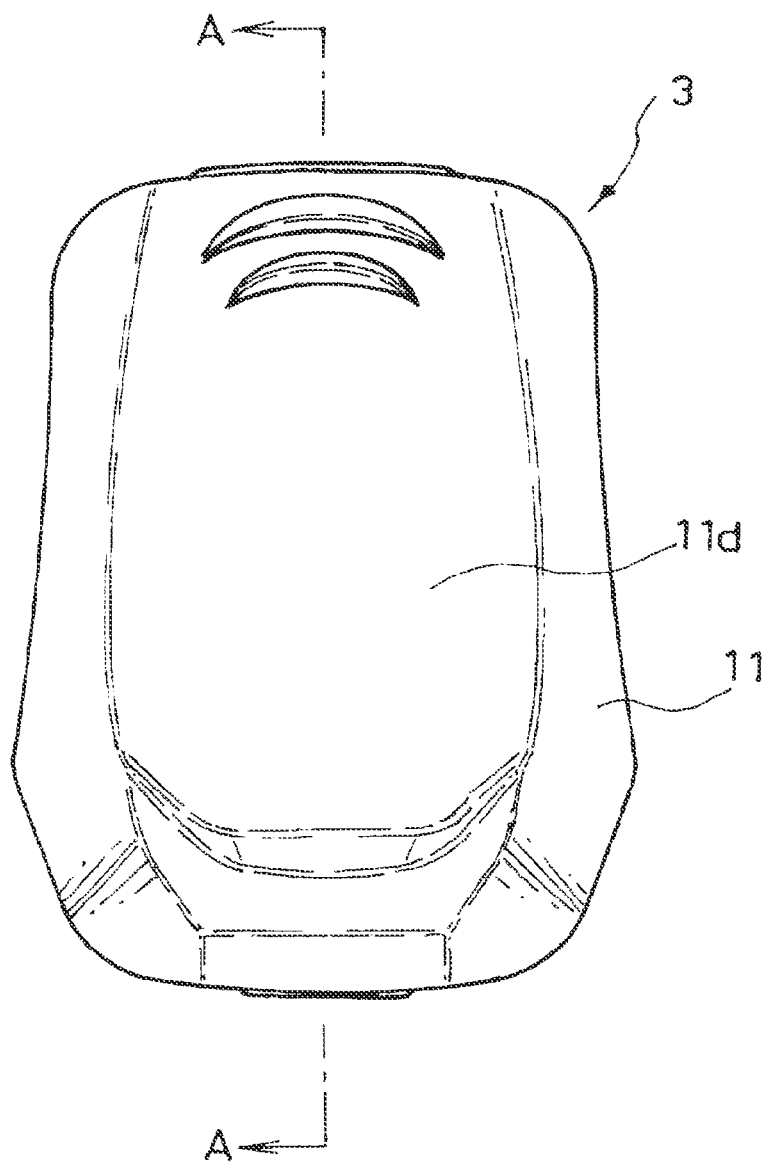
FIG. 14 is a front view of the second embodiment.

The female member 8 (base) includes, as shown in FIG. 13, a first opening 8a, a second opening 8b, and an insertion path 8c therebetween for the lace 2.

On the other hand, the male member 9 (slider), a part of which is inserted into the insertion path 8c from the first opening 8a side, includes, in the part, a male side fastening member 9a which is fastened to the lace 2 inserted to the insertion path 8c cooperating with a female side fastening portion 8d formed in the insertion path 8c.

Also, between the female member 8 and the male member 9, interposed is a spring member 10 which accumulates an urging force by the pulling operation. In the illustrated embodiment, the spring member 10 is a compression coil spring which accumulates the urging force by the pulling operation.

The fastening to the lace 2 is released by reducing the insertion amount of the part of the male member 9 into the insertion path 8c relative to the female member 8.

The fastening to the laces 2 can be released by the pulling operation reducing the insertion amount of the part of the male member 9 into the insertion path 8c relative to the female member 8 while holding the laces 2 drawn out from the first opening 8a side, and reducing the insertion amount of the part of the male member 9 into the insertion path 8c relative to the male member 9 while holding the laces 2 drawn out from the second opening 8b side.

In the embodiment, in the cord lock main body 7, the laces 2 pass on two sides with a movement center line x (refer to FIG. 12) of the male member 9.

Figure 12:
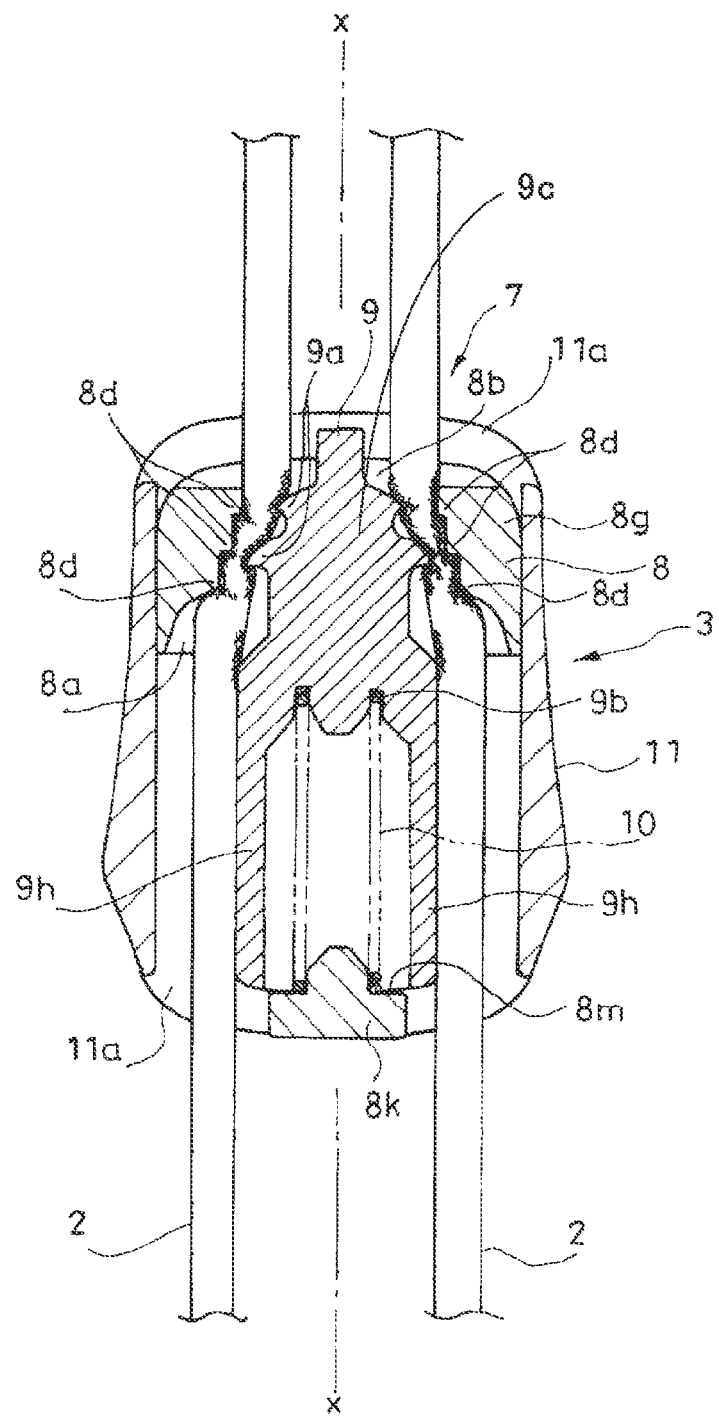
FIG. 12 is a sectional view showing a using condition of the second embodiment, showing a state of fastening to the lace.

In a state without the pulling operation, the laces 2 can be sandwiched by the male side fastening member 7 and the male side fastening member 9a in the insertion path 8c by the spring member 10, so that the cord lock 3 including the cord lock main body 7 can be fastened at a desired position of the lace 2 (refer to FIG. 12).

When holding the laces 2 drawn out from the first opening 8a side and pulling operation toward the upper side in FIG. 12 relative to the female member 8 are made, the fastening condition to the laces 2 of the cord lock 3 is released, and the cord lock 3 as a whole moves to the upper side shown in FIG. 12. When the pulling operation toward the upper side is stopped, the cord lock 2 is once again fastened to the laces at the position after the movement. Also, when holding the laces 2 drawing out from the second opening 8b side and pulling operation toward the lower side in FIG. 12 are made, the fastening condition to the laces 2 of the cord lock 3 is released, and the cord lock 3 as a whole moves to the lower side shown in FIG. 12. When the pulling operation to the lower side is stopped, the cord lock 3 is once again fastened to the laces 2 at the position after the movement.

Figure 10:
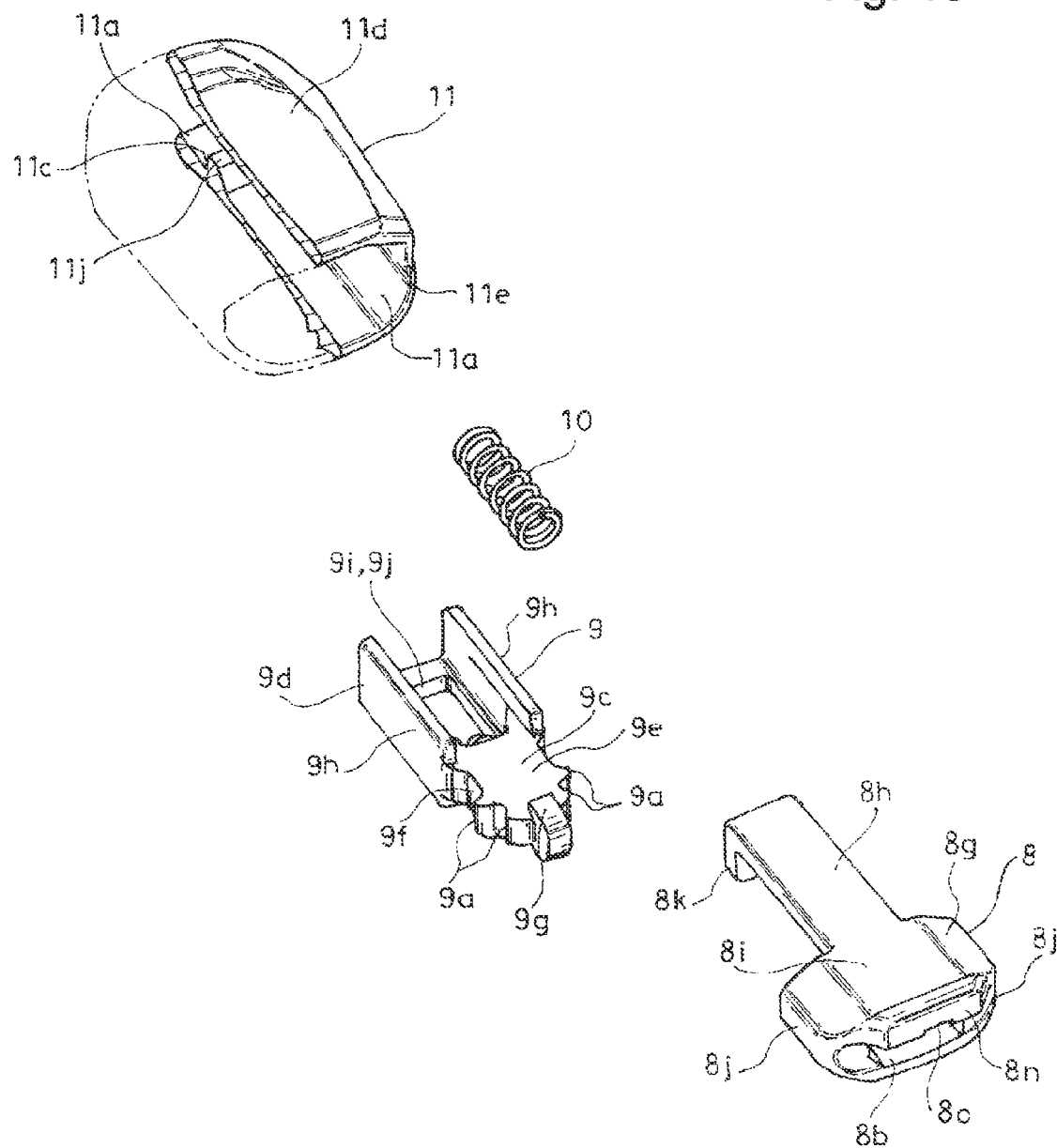
FIG. 10 is an exploded perspective view of the second embodiment.
Figure 11:
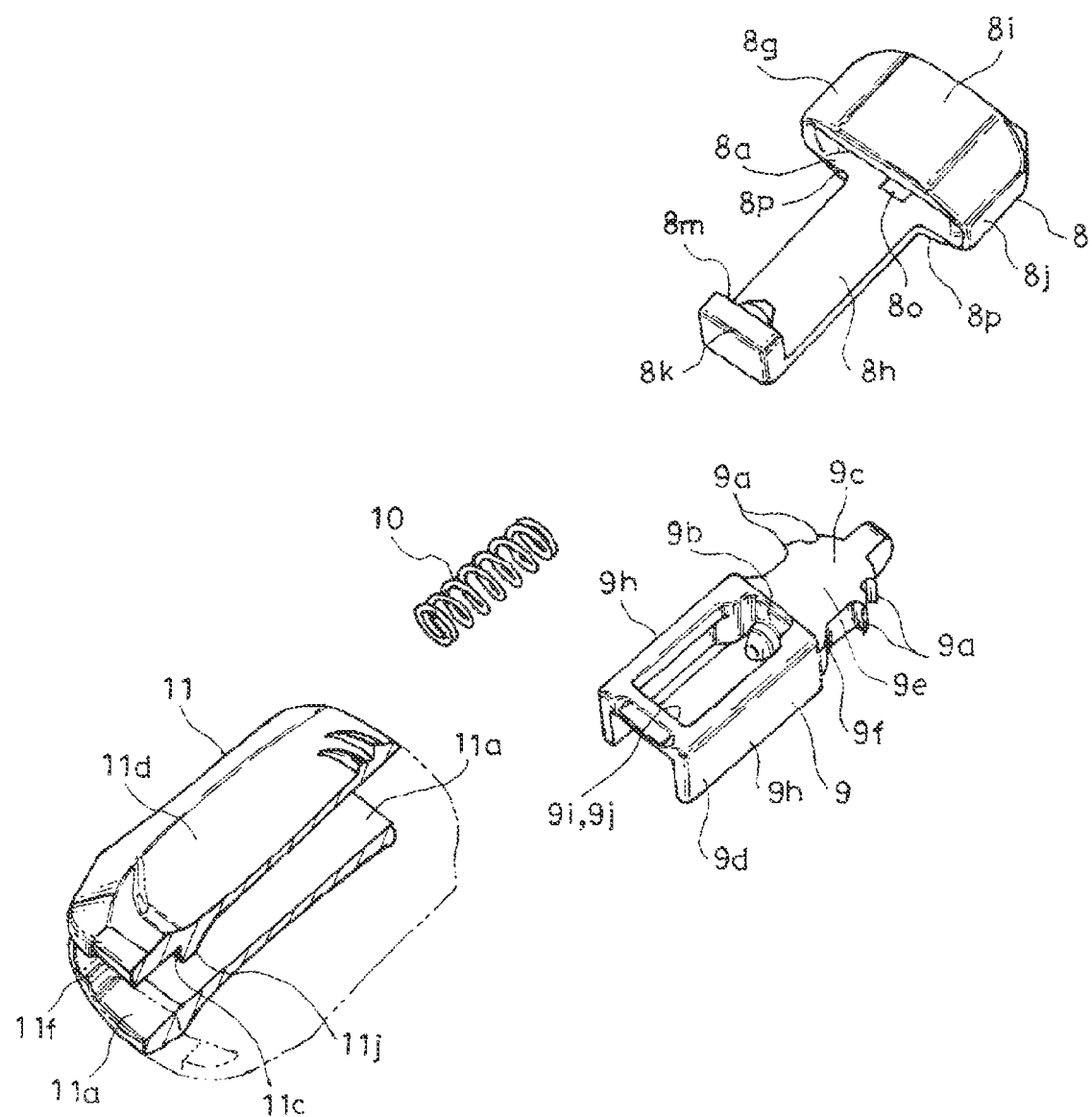
FIG. 11 is an exploded perspective view of the second embodiment.

The female member 8 includes, as shown in FIGS. 10 and 11, a male side main body 8g, and a leg 8h.

The female side main body 8g has a substantially flat cylindrical shape in a sectional view in a direction perpendicular to the movement center axis x of the male member 9 (FIG. 12).

Namely, the male side main body 8g has a pair of wide width face portions 8i with a face in a direction perpendicular to the movement center axis x to have a greater size, and a pair of thickness side face portions 8j between the pair of wide width face portions.

One end of the female side main body 8g functions as the first opening 8a, and the other end of the female side main body 8g functions as the second opening 8b.

The inner face of the thickness side face portion 8j of the male side main body 8g inclines in a direction to reduce the inner size of the female side face portion 8j as it comes closer to the second opening 8b. In the illustrated embodiment, on both sides sandwiching the movement center axis x, the female side fastening portions 8d are formed. In the illustrated embodiment, the female side fastening portions 8d are formed in the inner face of the thickness side face portion 8j by alternately forming, in a direction of the movement center axis x, a step 8e substantially parallel to the movement center axis x and a step 8f substantially perpendicular to the movement center axis x (refer to FIG. 13).

The leg 8h has a band-like plate shape, as shown in FIG. 11, projecting outward along the movement center axis x from an edge forming the first opening 8a in the female side main body portion 8g. The width in a direction perpendicular to the movement center axis x of the leg 8h is smaller than the width of the female side main body portion 8g in the same direction, and the leg 8h continues from one of the pair of the wide width portions 8i and extends along the movement center axis x. Thereby, engagement-abutted portions 8p explained later are formed on both sides of the leg portion 8h.

Also, a projecting portion 8k is formed on the extending end of the leg 8h. A side facing the first opening 8a in the projecting portion 8k functions as a first abutment portion 8m of the spring 10.

In the illustrated embodiment, a size of one of the pair of wide width face portions 8i along the movement axis x is greater than that of the other of the pair of wide width face portions 8i along the movement axis x, and the one of the pair of wide width face portions 8i has a portion 8n projecting from the second opening 8b for the difference.

Also, in the illustrated embodiment, in one of the pair of wide width face portions 8i, a guide groove 8c continuing from the second opening 8b to the first opening 8a side is formed along the movement center axis x (refer to FIG. 11), and in this guide groove 8c, a guided portion 9g (refer to FIG. 10) of a front end 9c, explained later, of the male member 9 is guided.

On the other hand, the male member 9 includes, as shown in FIG. 11, the male member side fastening portion 9a, and a second abutment portion 9b for the other end of the spring member 10 on the side opposite to a side where the male member side fastening side 9a is formed.

The male member 9 includes a solid front portion 9c which is a part entering into the female member 8, and a rear portion 9d which does not substantially enter into the female side main body portion 8g of the female member 8.

The front portion 9c includes, as shown in FIG. 10, wide width portions 9e facing inner faces of the wide width portions 8i of the female member 8, and side face portions 9f facing inner faces of the thickness-side face portions 8j of the female member 8. A guided portion 9g entering the guide groove 8c of the female member 8 is formed on one of the two wide width portions 9e of the front portion 9c.

In the illustrated embodiment, the male member 9 is arranged, as shown in FIG. 12, such that the front end 9c is located along the movement center axis x, and is assembled with the female member 8 in a state that the laces 2 can pass respectively on the left and right of the front end 9c.

Craws which become the male side fastening members 9a are formed, as shown in FIGS. 10 and 11, on the two side face portions 9f of the front portion 9c. The craws are formed with two to have a space relative to the adjacent craw in the movement center axis x.

A connecting end in the front portion 9c relative to the rear portion 9d becomes, as shown in FIG. 11, a face perpendicular to the movement center axis x, and this face functions as a second abutment portion 9b for the other end of the spring member 10.

The rear portion 9d is formed by a pair of wall portions 9h formed along the movement center axis x. One of the pair of wall portions 9h is formed to continue to one of the side face portions 9f of the front portion 9c, and the other of the pair of wall portions 9h is formed to continue to the other of the side face portions 9f of the front portion 9c. The second abutment portion 9b is located between the pair of wall portions 9h, and the compression coil spring as the spring member 10 is retained between the pair of wall portions 9h.

Also, in a state that the male member 9 and the female member 8 are combined, the pair of wall portions 9h of the male member 9, the second abutment portion 9b, the leg 8h, and the first abutment portion 8m cooperate together to form the holding portion of the spring member 10.

In particular, the male member 9 and the female member 8 are assembled such that the front end 9c which is a part of the male member 9 is located in the female side main body 8g of the female member 8, the projecting portion 8k of the leg 8h of the female member 8 is located between the pair of the wall portions 9h of the male member 9, and the guided groove 9g is received in the guide portion 80.

Figure 21:
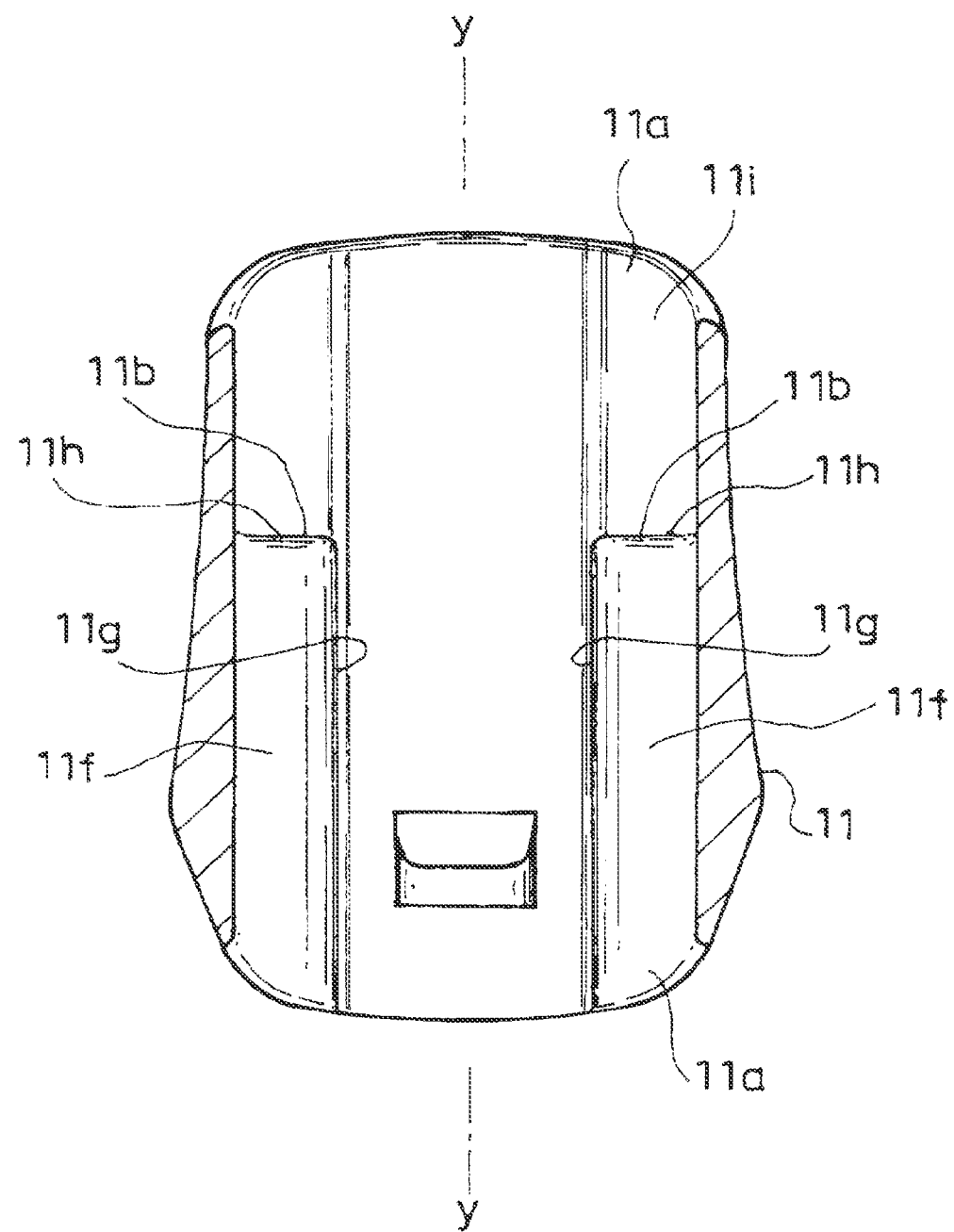
FIG. 21 is a sectional view taken along a position of line C-C in FIG. 20.

Also, the case 11 forms a cylindrical shape with passing openings 11a for the laces on two ends, and is assembled with the cord lock main body 7 side, such that the case 11 can reciprocate along the cylinder axis direction y (refer to FIG. 21). In the illustrated embodiment, the lases 2 extending from the first opening 8a of the female member 8 in the cord lock main body 7 extend, on two sides with the movement center axis x therebetween, respectively, outward from the passing openings 11a at the lower side as shown in FIG. 12 to the outside of the case through enlarged portions 11f, explained later, formed respectively on the pair of wide width portions 11d of the case 11. Also, the laces 2 extending from the second opening 8b of the female member 8 in the cord lock main body 7 extend outside of the case 11 from the passing openings 11a at the upper side of the case in FIG. 12.

In more detail, the case 11 is assembled with the cord lock main body 7 such that the cord lock main body 7 is received inside the case 11. And, in the assembled state, when the case 11 is moved to a lower side in FIG. 12 by holding the case 11, the case 11 together with the male member 9 is guided by the female member 8 side and is moved toward the lower side in FIG. 12 (a backward movement explained later). Also, when the case 11 is moved to an upper side in FIG. 12 by holding the case 11, the case 11 together with the female member 8 is guided by the male member 9, and is moved to the upper side in FIG. 12 (an outbound movement explained later).

Figure 18:
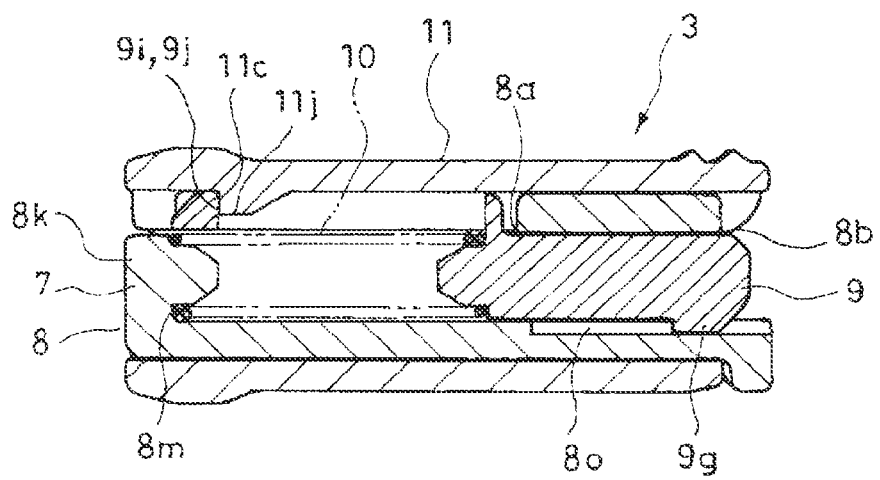
FIG. 18 is a sectional view taken along a position of line A-A in FIG. 14.
Figure 19:
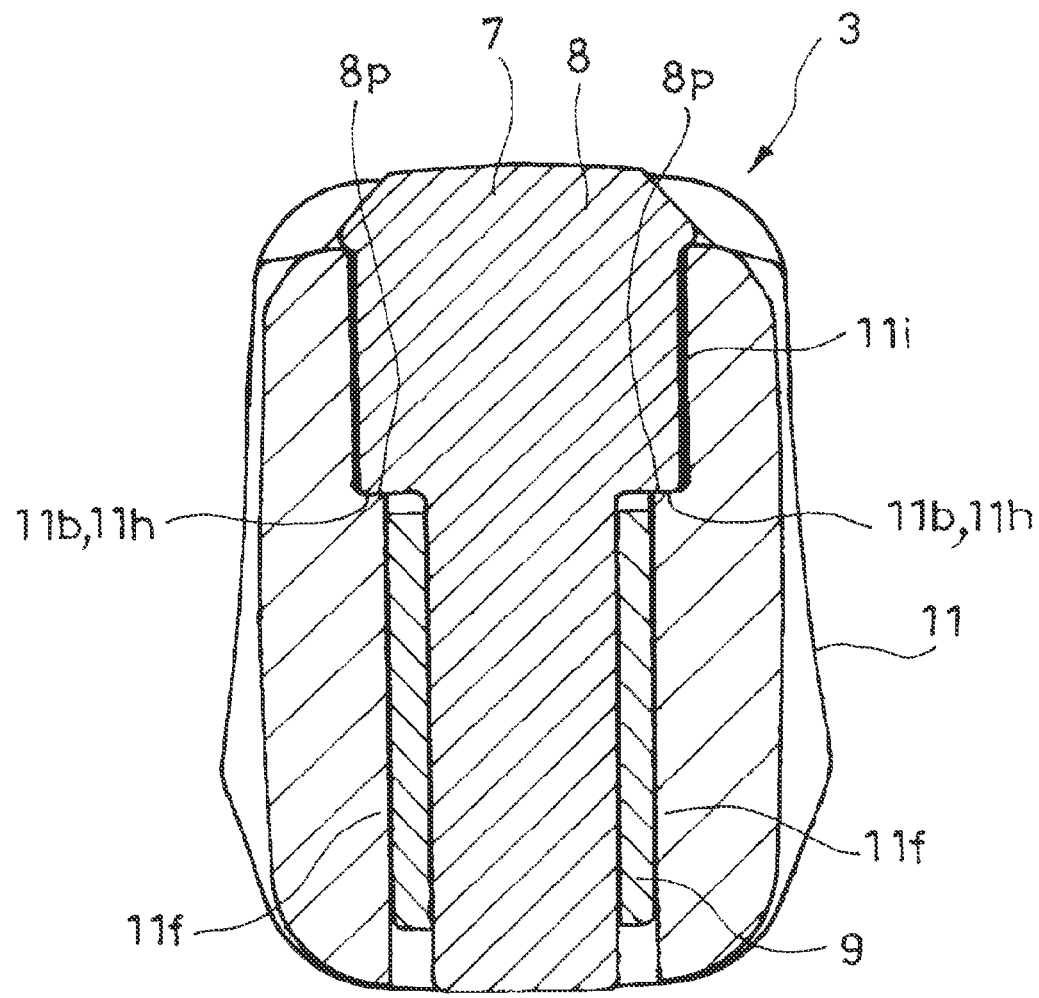
FIG. 19 is a sectional view taken along a position of line B-B in FIG. 17.
Figure 20:
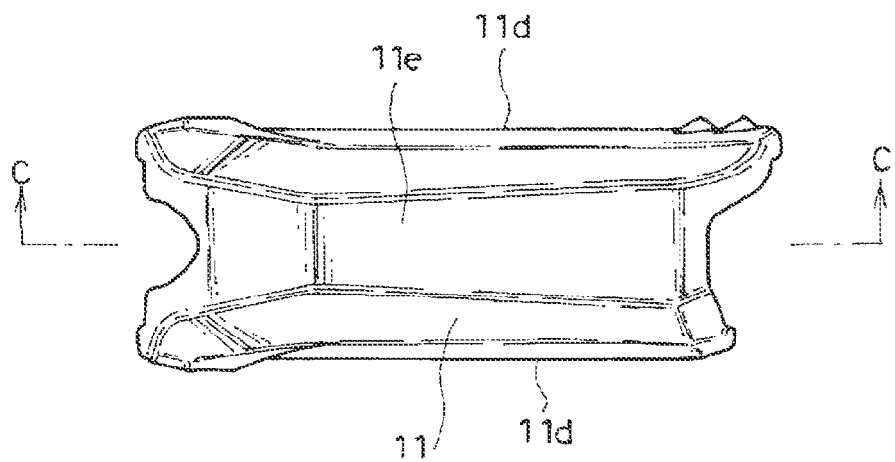
FIG. 20 is a side view showing a case forming the second embodiment.

In the embodiment, at the time of a forward movement, a first engage-abutting portions 11b of the case 11 abut against engage-abutted portions 8p of the female member 8 to thereby cause a pulling operation (refer to FIG. 12 and FIG. 19), and at the time of backward movement of the case 11, a second engage-abutting portion 11c of the case 11 abuts against an engage-abutted portion 9i of the male member 9 to thereby cause the pulling operation (refer to FIG. 12 and FIG. 18).

Also, the case 11 has a size to cover the entire cord lock main body 7.

Figure 15:
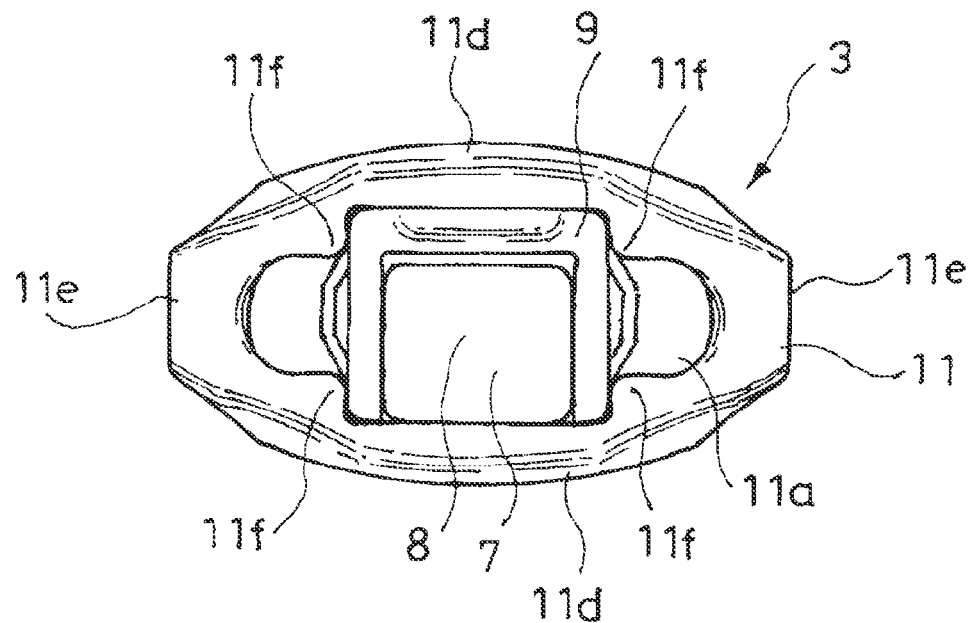
FIG. 15 is a bottom view of the second embodiment.
Figure 16:
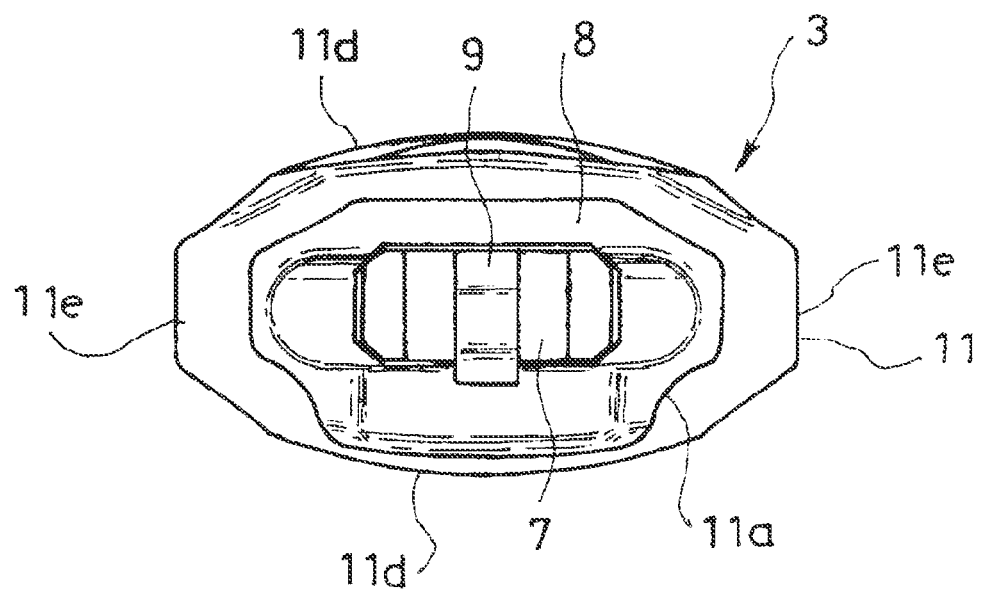
FIG. 16 is a plan view of the second embodiment.
Figure 17:
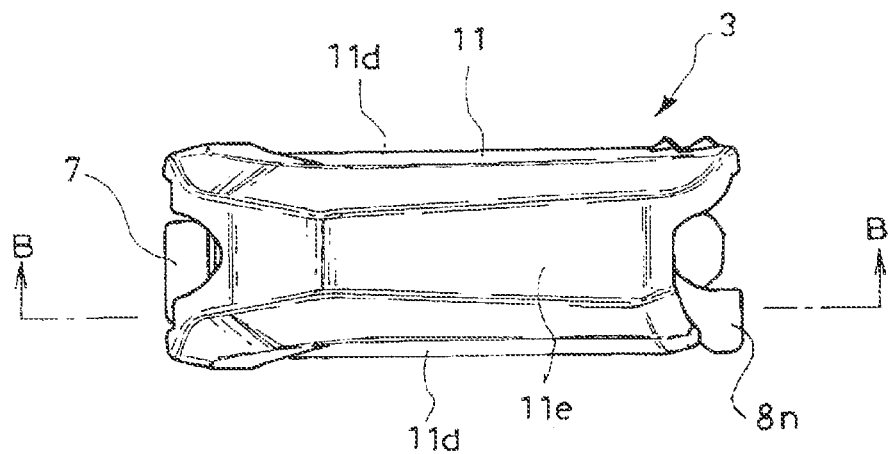
FIG. 17 is a side view of the second embodiment.

In the illustrated embodiment, as shown in FIG. 15, the case 11 has a flattened cylindrical shape. Namely, the case 11 has a pair of wide width face portions 11d, and a pair of thickness side face portions 11e. A distance between inner faces of the wide width face portions 11d is substantially equal to a distance between outer faces of the pair of wide width face portions 8i of the female member 8 of the cord lock main body 7 (refer to FIG. 18).

At the inner sides of the pair of wide width face portions 11d, as shown in FIG. 21, raised portions 11f forming wall portions 11g to suppress wobbling in the left-right direction of the cord lock main body 7 are formed between the first engage-abutting portions 11b and the second engage-abutting portion 11c of the case 11.

Figure 22:
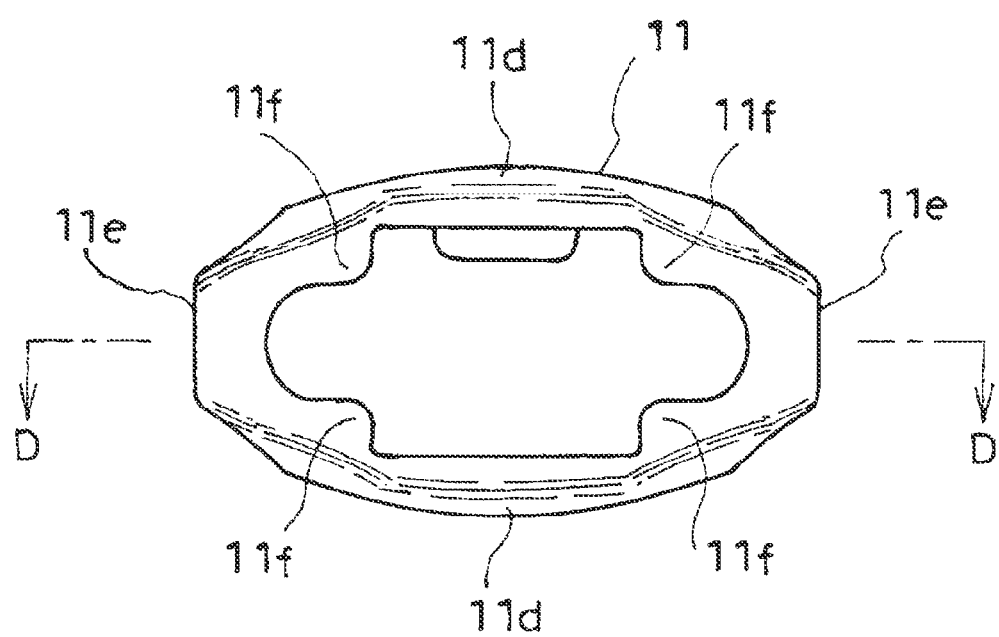
FIG. 22 is a bottom view of a case forming the second embodiment.
Figure 23:
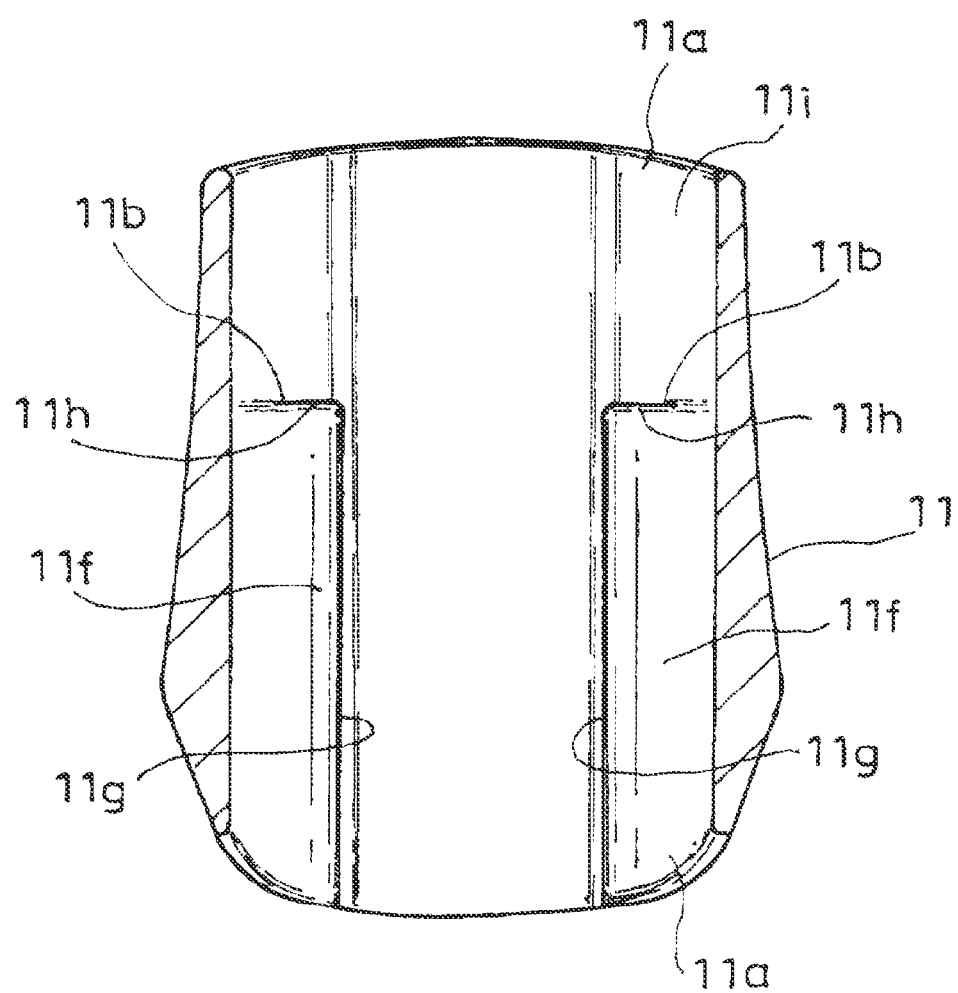
FIG. 23 is a sectional view taken along a position of line D-D in FIG. 22.

The raised portions 11f are formed, as shown in FIG. 22, on the left and right of the respective pair of wide width face portions 11d. Also, the raised portion 11f is formed to continue from the passing opening 11a of the case 11 located at the lower side of FIG. 21 to the passing opening 11a located at the upper side of FIG. 21 along the cylindrical axis direction, and ends at a position spaced apart from the passing opening 11a located above. Between an end of the raised portion 11f and the passing opening 11a located above, a space 11i is formed in which the female side main body 8g of the female member 8 is fitted.

In the embodiment, from the passing opening 11a at the upper side in FIG. 21 in the case 11, the cord lock main body 7 is inserted with the leg 8h of the female member 8 and the rear portion 9d of the male member 9 ahead, with the wide width portions 11d of the case 11 facing the wide width portions 8i of the female member 8, and with the thickness side face portions 11e of the case 11 facing the outer faces of the wall portions 9h forming the rear portion 9d of the male member 9. At the position where the cord lock 8 is fully inserted in the case 11, the edge around the first opening 8a of the female side main body 8g of the female member 8 abuts against the step 11h facing one side of the passing opening 11a as the end of the raised portion 11f of the case 11. Also, in the rear end 9d of the male member 9, the outer faces of the wall portions 9h of the rear end 9d of the male member 9 corresponding to the wall portions 11g of the raised portions 11f contact between the left and right raised portions 11f to fit without wobbling.

Namely, in the embodiment, the step 11h facing one side of the passing opening 11a as the end of the raised portion 11f functions as the first engage-abutting portion 11b.

Also, in the embodiment, a projection 11j is formed at a position in one of the inner faces of the pair of the wide width face portions 11d, at the passing opening 11a side of the lower side in FIG. 21 and between the left and right raised portions 11f (refer to FIG. 11 and FIG. 18). Also, a crosslinking portion 9j linking the pair of wall portions 9h is formed at the projecting end projecting from the main portion of the male member 9 in the pair of wall portions 9h forming the rear portion 9d of the male member 9 (refer to FIG. 11).

And, in the embodiment, at the position where the cord lock main body 7 is fully entered in the case 11 from one of the passing openings 11a (the passing opening 11a at the upper side in FIG. 21), the projection 11j as the second engage-abutting portion 11c is caught from one side of the passing opening 11a to the cross-linking portion 9j as the engage-abutted portion 9i of the male member 9.

In the illustrated embodiment, one or both of the case 11 and the male member 9 elastically deforms when the projection 11j abuts against the crosslinking portion 9j as the engage-abutting portion in inserting the cord lock main body 7 into the case 11, to allow further insertion of the cord lock main body 7 into the case 11, and by elastically returning at the position where the projection 11j passes over the crosslinking portion 9j, as explained before, the projection 11j is caught at the crosslinking projection 9j.

Incidentally, apparently, the present invention is not limited to the above embodiments, and the invention includes all embodiments which can achieve the object of the invention.

EXPLANATION OF SIGNS

2 Cord
7 Cord lock main body
8 Female member
8c Insertion path
8p Engage-abutted portion
9 Male member
9i Engage-abutted portion
11 Case
11a Passing opening
11b First engage-abutting portion
11c Second engage-abutting portion
Y Cylindrical axis direction The specification, claims, drawings and abstract of Japanese Patent Application No. 2019-165652 filed on Sep. 11, 2019 are all cited herein, and are incorporated as disclosure of the specification of the invention.

What is claimed is:

1. A cord lock comprising:
a cord lock main body including:
a female member having a first opening, a second opening, and an insertion path for a cord extending between the first opening and the second opening, and
a male member, a part of which is inserted into the insertion path from a first opening side, having a male side fastening member formed on said part, fastened to the cord inserted into the insertion path cooperating with a female side fastening member formed in the insertion path,
wherein fastening to the cord is released by a pulling operation of reducing an insertion amount of said part of the male member into the insertion path,
a case retaining the cord lock main body and having a cylindrical shape with passing openings for the cord at two ends, the case being assembled with the cord lock main body to be able to reciprocate along a cylindrical axis direction, and
a connecting member configured to be arranged between the case and a member where the cord is attached,
wherein at a time of a forward movement of the case, a first engage-abutting portion of the case engage-abuts against an engage-abutted portion of the female member and the pulling operation of the cord is made while a movement of the case is held by the connecting member, and
at a time of a backward movement of the case, a second engage-abutting portion of the case engage-abuts against an engage-abutted portion of the male member and the pulling operation is made by holding and moving the case backward.

2. The cord lock according to claim 1, wherein the case has a size covering an entirety of the cord lock main body.

3. The cord lock according to claim 1, wherein a wall portion is formed between the first engage-abutting portion and the second engage-abutting portion of the case for preventing wobbling in a left-right direction of the cord lock main body.

4. The cord lock according to claim 1, wherein the first engage-abutting portion of the case is a step portion oriented on one side of the passing openings, and abutting against the engage-abutted portion of the female member at a position where the cord lock main body is fully inserted into the case from one of the passing openings.

5. The cord lock according to claim 1, wherein the second engage-abutting portion of the case is a projection caught at the engage-abutted portion of the male member from one side of the passing openings at a position where the cord lock main body is fully inserted into the case from one of the passing openings.

6. The cord lock according to claim 1, wherein a spring member for accumulating force by the pulling operation is interposed between the female member and the male member.

7. The cord lock according to claim 1, wherein the cord lock main body further includes a spring arranged between the male member and the female member, separated from the case, to urge the male side fastening member to the female side fastening member.

8. The cord lock according to claim 1, further comprising a knob attached to the cord, and a holding portion attached to the member where the cord is attached, the knob being detachably fixed to the holding portion.

9. The cord lock according to claim 1, wherein the case has a through hole through which the connecting member is attached to the case.

\* \* \* \* \*